United States Patent [19]

Steele

[11] 3,967,239

[45] June 29, 1976

[54] VEHICLE ANTI-THEFT ALARM CIRCUIT

[75] Inventor: Robert E. Steele, Warren, Ohio

[73] Assignee: General Motors Corporation, Detroit, Mich.

[22] Filed: Nov. 15, 1974

[21] Appl. No.: 523,977

[52] U.S. Cl. .............................. 340/63; 307/10 AT; 180/114
[51] Int. Cl.² .......................................... B60R 25/10
[58] Field of Search .......................... 340/63, 64, 65; 307/10 AT; 180/114

[56] References Cited
UNITED STATES PATENTS

| | | | |
|---|---|---|---|
| 3,585,584 | 6/1971 | Behrend | 340/64 |
| 3,740,713 | 6/1973 | Teich | 340/64 |
| 3,781,854 | 12/1973 | Kaufman | 340/64 |

*Primary Examiner*—Alvin H. Waring
*Attorney, Agent, or Firm*—Albert F. Duke

[57] ABSTRACT

An anti-theft system for a motor vehicle which includes an ARM ENABLE latch and an ARM latch which establish a circuit arming condition in response to movement of a key operated switch from a neutral to an arming position. An ALARM latch is responsive to a plurality of sensor switches which in turn are responsive to whether a compartment of the vehicle is open or closed. If a compartment is opened after the arming condition has been established the ALARM latch causes the vehicle horn to be periodically energized for a predetermined interval of time. Delay means are provided for preventing a change of state of the various latches for a predetermined interval of time after actuation of the switch controlled input to the latch so as to prevent inadvertent triggering of the latch circuit. Indicator means are provided for detecting a malfunction in the system which would prevent the circuit arming condition from being established.

5 Claims, 1 Drawing Figure

U.S. Patent June 29, 1976 3,967,239
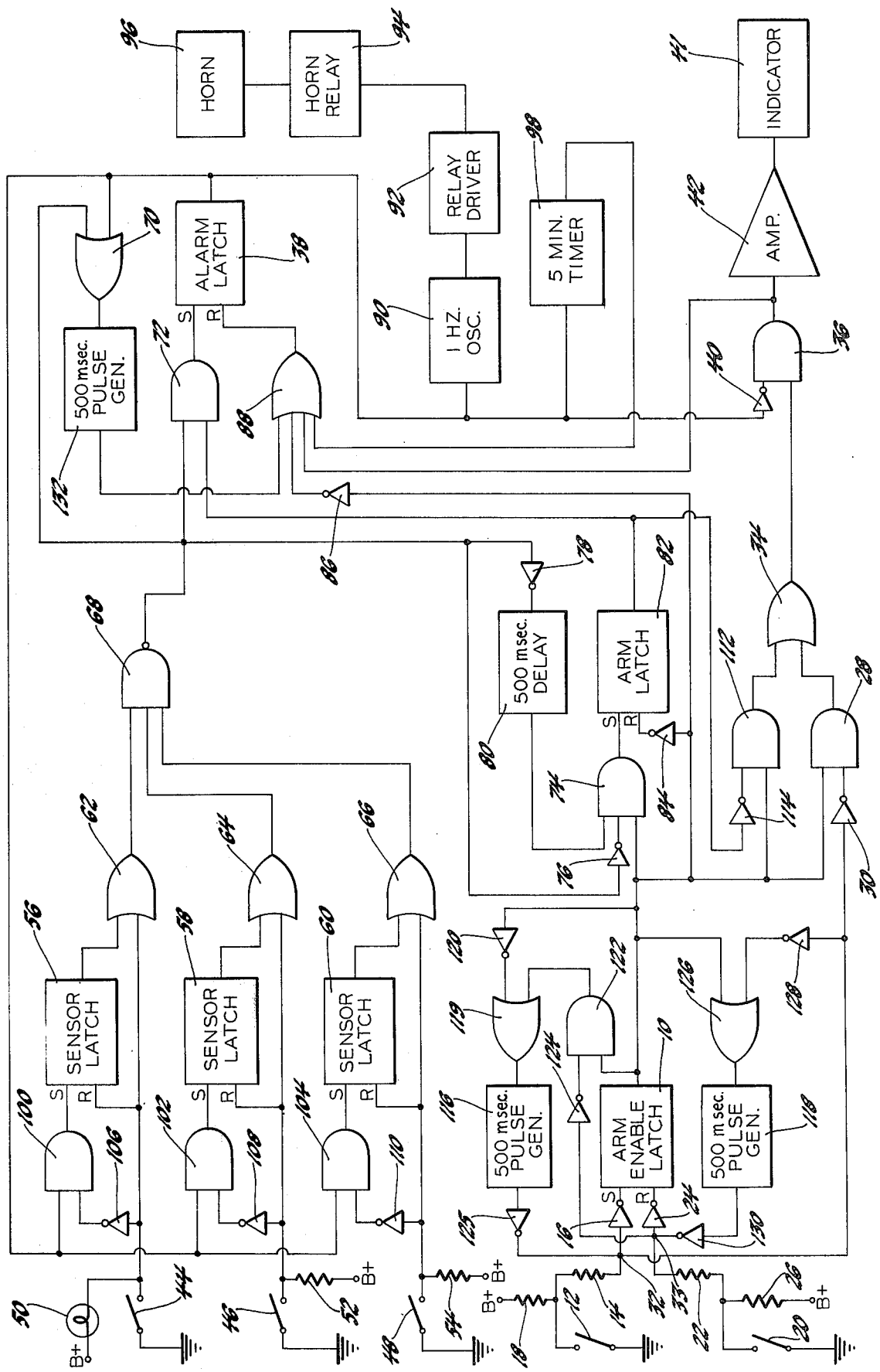

VEHICLE ANTI-THEFT ALARM CIRCUIT

This invention relates to anti-theft systems and more particularly to an electronic anti-theft system for a motor vehicle.

Various systems for deterring theft of automobiles have been recently proposed. Generally, these systems include switches for detecting intrusion into one or more compartments of the vehicle and also include a key operated switch for arming an alarm control device which thereafter responds to an intrusion by sounding an alarm. One of the problems associated with such systems is the inadvertent energization of the alarm from transient conditions such as switch bounce. Another problem is the undetected malfunction of the arming circuitry which renders the system inoperative.

It is an object of the present invention to provide an improved electronic anti-theft system.

It is another object of the present invention to provide an anti-theft system which is relatively immune to transient switch closures.

It is another object of the present invention to provide means for monitoring an anti-theft system for indicating to the driver of a motor vehicle whether the system is functioning properly.

These and other objects and advantages of the present invention will be more apparent from the following detailed description which should be read in conjunction with the single drawing which shows a logic block diagram of the system of the present invention.

Referring now to the single drawing, an ARM ENABLE latch generally designated 10 is set from an arming switch 12 through a current limiting resistor 14 and an inverter 16. The switch 12 has one terminal grounded and the other terminal connected through a pull-up resistor 18 to a source of DC potential designated B+. When the switch 12 is closed the output of the latch 10 is driven high. Similarly, the latch 10 is reset from a disarming switch 20 through a current limiting resistor 22 and an inverter 24. One terminal of the switch 20 is grounded and the other terminal is connected to B+ through a pull-up resistor 26. When the switch 20 is closed the output to the latch 10 is driven low. The ARM switch 12 and DISARM switch 20 are preferably operated from a single actuator such as the vehicle door key. When the key is removed from the door lock the switches 12 and 20 take the positions shown. The switch 12 may be closed by rotating the key to the door locking position and the switch 20 may be closed by rotating the key to the door unlocking position.

The output of the latch 10 is connected as one input to an AND gate 28 the other input of which is connected through an inverter 30 to the terminal 32. The output of the gate 28 is connected through an OR gate 34 to one input of an AND gate 36. The other input to the gate 36 is from an ALARM latch 38 through an inverter 40. The output of the gate 36 controls an indicator 41 through an amplifier 42. Thus, if the latch 10 is operable the indicator 41 will be energized during the interval that the switch 12 is closed.

Normally open sensor switches 44, 46 and 48 sense intrusions into various compartments of the vehicle. For example, the switch 44 may be associated with the passenger compartment and is closed upon opening of one of the doors. The switches 46 and 48 are associated respectively with the hood and trunk of the vehicle and close upon opening of these closures. The switch 44 may be the usual door jam switch having one terminal grounded and the other terminal connected to B+ through a lamp 50. The switches 46 and 48 have one terminal grounded and the other terminal connected to B+ through pull-up resistors 52 and 54 respectively. SENSOR latches 56, 58 and 60 are normally in a reset condition where their output is low when the switches 44, 46 and 48 are open, since under those conditions a high input is applied to the reset terminal. The output of each of the latches 56, 58 and 60 provide one input to OR gates 62, 64 and 66 respectively. The other input to the OR gates 62, 64 and 66 are from the switches 44, 46 and 48 and is high as long as the switches are open. The outputs of the gates 62, 64 and 66 provide inputs to a NAND gate 68 the output of which is applied as one input to OR gate 70, AND gate 72, and AND gate 74 through inverter 76. The output of the gate 68 is also applied as a second input to the gate 74 through an inverter 78, and delay means 80. The output of the latch 10 provides a third input to the gate 74. The output of the latch 10 is also connected to the reset terminal of an ARM latch 82 through an inverter 84. The output of the latch 10 is applied through an inverter 86 and an OR gate 88 to the reset input of ALARM latch 38. The output of the ARM latch 82 also provides one input to an AND gate 112 through an inverter 114. The other input to the gate 112 is from the ARM ENABLE latch 10. The output of the gate 112 provides a second input to the OR gate 34. The output of the gate 36 is also applied to the reset input of the latch 38 through gate 88.

The output of the latch 38 is connected with a 1 Hz. oscillator 90. The oscillator 90 is energized when the latch 38 is set and periodically energizes a relay driver 92 which controls the horn relay 94 which in turn energizes the vehicle horn 96. The inputs and outputs of the gate 36 and latch 38 prevent concurrent energization of the indicator 41 and horn 96. The output of the latch 38 also is applied to a five minute timer 98 which resets the latch 38 through the gate 88 after a five minute interval. The output of the latch 38 is connected with the set input on the SENSOR latches 56, 58 and 60 through AND gates 100, 102 and 104. The other input to the gates 100, 102 and 104 is from the switches 44, 46 and 48 through inverters 106, 108 and 110.

Transient protection is provided for the ARM ENABLE latch 10 by 500 millisecond pulse generators 116 and 118. The input to the generator 116 is from an OR gate 119 having inputs connected to the output of the ARM ENABLE latch 10 through an inverter 120 and an AND gate 122. The other input to the AND gate 122 is from terminal 33 through an inverter 124. Similarly, the generator 118 receives an input from an OR gate 126 having inputs connected with the output of the latch 10 and from the terminal 32 through an inverter 128. The output of the generator 116 is connected with the terminal 32 through an inverter 125 while the output of the generator 118 is connected with the terminal 33 through an inverter 130. As previously indicated, the purpose of the generators 116 and 118 is to prevent arming or disarming of the latch 10 from transients. Assuming the latch 10 is in a reset condition, closure of the ARM switch 12 drives the terminal 32 low which raises the input to the generator 118 through the inverter 128 and OR gate 126 causing the terminal 33 to go low. Accordingly, both inputs to the latch 10 are high and will remain so for 500 milliseconds at which time terminal 33 goes high and the reset on the latch 10 is released permitting its output to go high. Similarly, when the output latch 10 is high, closure of the DISARM switch 20 causes both inputs to the AND gate 122 to go high driving the terminal 32 low and maintaining both inputs to the latch 10 high for 500 milliseconds until the generator 116 causes the terminal 32 to go high to release the set input to the latch 10. Pulse generator 132 performs a similar function with reference to the ALARM latch 38 and closure of one of the switches 44, 46 or 48. For example, if the switch 44 closes the output of the gate 68 goes high and raises the reset input to the latch 38 through the gate 70 and generator 132 for 500 milliseconds. Thereafter, the reset input to the latch 38 is released and the latch 38 may be set to drive its output high.

The operation of the system is as follows: Closure of the switch 12 drives the output of the ARM ENABLE latch 10 high and releases the reset on the ARM latch 82 and the ALARM latch 38. Assuming the switches 44, 46 and 48 are open, i.e. assuming the closure members associated therewith are closed, the output of the gate 68 is low and inputs to the gate 74 from the inverter 76 and the delay 80 are both high. Thus, upon closure of the switch 12 the reset input on the latches 82 and 38 are released and the latch 82 is set driving its output high. With the ARM switch 12 closed, both inputs to the gate 28 are high and since the output of the latch 38 is low both inputs to the AND gate 36 are high causing the indicator 41 to be energized. Upon release of the ARM switch 12 the output of the inverter 30 goes low and the indicator 41 will be extinguished assuming the system is operating properly and all compartments are secure. If for example, however, the system is not functioning properly and closure of the ARM switch 12 does not in fact set the ARM latch 82, its output will remain low and the indicator 40 will remain energized from the gate 112. Also, if one of the compartments is opened at the time the system is armed the output of the gate 68 will be high preventing the latch 82 from being set through the gate 74 so that the output of the latch 82 will be low thereby maintaining the indicator 40 energized. Further, if closure of the switch 12 does not drive the output of the latch 10 high then the indicator 40 will not be energized at all. The indicator 40 thus provides a means of informing the vehicle operator of a malfunction of the system. Assuming that the system is properly functioning, the outputs of the latches 10 and 82 will be high when the system is in an ARMED state. Thereafter, if one of the switches 44, 46 or 48 closes, for example the switch 44, the output of the gate 68 will go high raising both inputs to the gate 72 and raising the set input on the latch 38. 500 milliseconds thereafter, the reset input to the latch 38 will be released by the pulse generator 132 and the latch 38 will be driven to a set state where its output is high. This raises both inputs to the AND gate 100 setting the SENSOR latch 56, raising the output of the gates 62 and lowering the output of the gate 68. When the ALARM latch 38 goes high the horn 96 and/or other warning devices are periodically energized at a one cycle per second rate for a period of five minutes at which time the latch 38 is reset. During the 5 minute interval the output of the gate 62 remains high regardless of the position of the switch 44. For example, if the passenger compartment door is closed after the alarm is sounded the latch 56 will be reset but the other inputs to the gate 62 will be high maintaining its output high. By disregarding the position of the switch 44 that caused the alarm to be sounded, the opening of another compartment after the alarm has been extinguished will cause the alarm to be reenergized. Without the latches 56, 58 and 60 violation of one compartment would prevent reenergization of the alarm from another sensor after the five minute interval. The system can be placed in the DISARMED state by closing the switch 20 which resets the latches 10, 82 and 38.

The delay 80 prevents the alarm from being sounded as a result of contact bounce which might be associated with the switches 44, 46 and 48 under circumstances where the compartment is opened at the time the system is enabled. For example, if the switch 44 is closed, i.e. the door is open, and the ARM switch 12 is moved to the closed position the output of the ARM ENABLE latch 10 will be driven high. However, the ARM latch 82 will remain in a reset condition since the gate 74 is disabled as a result of the switch 44 being closed. The fact that one of the compartments is opened will be indicated to the driver by the indicator 40 remaining energized. Upon subsequent closing of the compartment, i.e. opening of the switch 44, the system will be armed but only after a 500 millisecond delay. Since the ARM latch 82 cannot be set for 500 milliseconds after opening of the switch 44 the gate 72 is disabled during this period of time and consequently, any contact bounce associated with the switch 44 upon closure of the door cannot cause the ALARM latch to be set to sound the horn 96.

Having thus described my invention, what I claim is:

1. An anti-theft alarm circuit for a motor vehicle comprising sensor switch means for assuming first and second states in response to the opening and closing respectively of a vehicle compartment, signaling means, key operated switch means movable from a neutral position to an ARM position or a DISARM position, ARM ENABLE latch means connected with said key operated switch means and triggerable to an ARM ENABLE state upon movement of said key operated switch means to said ARM position and triggerable to a DISARM ENABLE state upon movement of said key operated switch means to said DISARM position, ARM latch means for establishing a circuit arming condition if said sensor switch means is in said second state and said ARM ENABLE latch means is in said ARM ENABLE state, ALARM latch means responsive to said sensor switch means assuming said first state after said arming condition has been established for energizing said signaling means, indicator means, logic means responsive to the state of said ARM ENABLE latch means and said ARM latch means and to the position of said key operated switch means for energizing said indicator means while said key operated switch means is in said ARM position if said ARM ENABLE latch means is triggered to said ARM ENABLE state and for deenergizing said indicator means when said key operated switch is returned to said neutral position unless said ARM latch means does not establish said circuit arming condition.

2. The circuit defined in claim 1 and further comprising delay means responsive to movement of said key operated switch means to said ARM or said DISARM position for preventing a change of state of said ARM ENABLE latch means for a predetermined interval of time, additional delay means responsive to said sensor switch means for preventing said ALARM latch means from responding to the opening of said compartment for a predetermined interval of time after said compartment has been opened.

3. The circuit defined in claim 1 including logic means interconnecting said indicator means and said ALARM latch means for preventing concurrent energization of said indicator means and said signaling means.

4. An anti-theft alarm circuit for a motor vehicle comprising a plurality of sensor switch means responsive to the opening and closing of a plurality of vehicle compartments respectively, signaling means, key operated switch means movable from an Off position to an ARM position, first latch means responsive to actuation of said key operated switch means to said ARM position to establish a circuit arming condition, ALARM latch means, logic means inteconnecting said plurality of sensor switch means and said first latch means with said ALARM latch means for driving said ALARM latch means to an alarm state to energize said signaling means in response to the opening of one of said compartments after said arming condition has been established, said logic means including a SENSOR latch, an AND gate, and an OR gate associated with each of said sensor switch means, each of said AND gates and each of said OR gates having one input connected with respective ones of said sensor switch means, each of said AND gates having a second input connected with the output of said ALARM latch, each of said SENSOR latch means having one input connected with the output of respective ones of said AND gates and a second input connected with respective ones of said sensor switches, and an output connected as a second input to respective ones of said OR gates, an additional AND gate having inputs connected with each of the outputs of said OR gates, a further AND gate having an input connected with the output of said first latch means and an input connected with the output of said additional AND gate, and an output connected with said ALARM latch means.

5. An anti-theft alarm circuit for a motor vehicle comprising sensor switch means for assuming first and second states in response to the opening and closing respectively of a vehicle compartment, signaling means, manually actuable switch means movable from a neutral position to an ARM position or a DISARM position, ARM enable latch means connected with said manually actuable switch means and triggerable to an ARM ENABLE state upon movement of said manually actuable switch means to said ARM position and triggerable to a DISARM ENABLE state upon movement of said manually actuable switch means to said DISARM position, ARM latch means for establishing a circuit arming condition when said sensor switch means is in said second state and said ARM ENABLE latch means is in said ARM ENABLE state, ALARM latch means responsive to said sensor switch means assuming said first state after said arming condition has been established for energizing said signaling means, indicator means, logic means responsive to the state of said ARM ENABLE latch means and said ARM latch means and to the position of said manually actuable switch means for energizing said indicator means if said ARM ENABLE latch means is triggered to said ARM ENABLE state when said manually actuable switch means is moved to said ARM position.

* * * * *